United States Patent
Sullivan et al.

(10) Patent No.: US 12,533,969 B2
(45) Date of Patent: Jan. 27, 2026

(54) QUADRANT PROTECTION IN STEADY AND TRANSIENT SHIFTER POSITIONS

(71) Applicant: FCA US LLC, Auburn Hills, MI (US)

(72) Inventors: Mary C Sullivan, Rochester Hills, MI (US); Rama Rohit Sagi, St. Joseph, MI (US); Ashay Sharma, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 169 days.

(21) Appl. No.: 18/594,469

(22) Filed: Mar. 4, 2024

(65) Prior Publication Data
US 2025/0276586 A1    Sep. 4, 2025

(51) Int. Cl.
*B60L 15/20* (2006.01)
*B60L 15/32* (2006.01)

(52) U.S. Cl.
CPC ....... *B60L 15/2054* (2013.01); *B60L 15/2072* (2013.01); *B60L 15/32* (2013.01); *B60L 2240/423* (2013.01)

(58) Field of Classification Search
None
See application file for complete search history.

(56) References Cited

U.S. PATENT DOCUMENTS

| | | | |
|---|---|---|---|
| 12,420,794 B2 * | 9/2025 | Jaccoud | B60W 20/10 |
| 2023/0382241 A1 * | 11/2023 | Ikushima | F16H 3/18 |

* cited by examiner

*Primary Examiner* — Todd Melton
(74) *Attorney, Agent, or Firm* — Jeremy J. Klobucar

(57) ABSTRACT

An electric vehicle includes an electric traction motor configured to selectively provide torque to vehicle wheels, a shifter configured to shift the electric vehicle, and a motor control system for electric traction motor quadrant protection in steady and transient shifter positions. The motor control system is in signal communication with the electric traction motor and the shifter, and includes a controller having one or more processors. The controller is programmed to monitor the shifter, detect a garage shift, and upon detecting the garage shift, filter the electric traction motor torque to zero to smoothly transition the electric traction motor during the garage shift and allow the garage shift to complete before an electric motor quadrant protection is initiated.

20 Claims, 5 Drawing Sheets

QUADRANT PROTECTION IN STEADY AND TRANSIENT SHIFTER POSITIONS

FIELD

The present application relates generally to electric vehicles and, more particularly, to electric motor control for quadrant protection in steady and transient shifter positions.

BACKGROUND

When driving a vehicle at low speed, a driver may perform a PRNLD shift, sometimes referred to as a "garage shift." For example, when the vehicle is in Reverse, the driver may suddenly shift to Drive while the vehicle is still moving backwards. However, in an electric vehicle, switching a driver torque request from a negative torque in Reverse to a positive torque in Drive may cause the vehicle software to immediately command a zero torque to protect the electric motor. This may result in an abrupt and jarring transition that may affect drive comfort. Thus, while such conventional systems do work well for their intended purpose, it is desirable to provide continuous improvement in the relevant art.

SUMMARY

In accordance with one example aspect of the invention, an electric vehicle is provided. In one example implementation, the electric vehicle includes an electric traction motor configured to selectively provide torque to vehicle wheels, a shifter configured to shift the electric vehicle, and a motor control system for electric traction motor quadrant protection in steady and transient shifter positions. The motor control system is in signal communication with the electric traction motor and the shifter, and includes a controller having one or more processors. The controller is programmed to monitor the shifter, detect a garage shift, and upon detecting the garage shift, filter the electric traction motor torque to zero to smoothly transition the electric traction motor during the garage shift and allow the garage shift to complete before an electric motor quadrant protection is initiated.

In addition to the foregoing, the described electric vehicle may include one or more of the following features: wherein the garage shift indicates a low vehicle speed shift maneuver from a first shifter position to a different second shifter position; wherein the first shifter position is Drive and the second shifter position is Reverse; wherein the first shifter position is Reverse and the second shifter position is Drive; and wherein the low vehicle speed shift maneuver occurs while the electric vehicle is in motion and the electric traction motor is providing torque to the vehicle wheels.

In addition to the foregoing, the described electric vehicle may include one or more of the following features: wherein said filtering the electric traction motor torque to zero comprises smoothly reducing or increasing the motor torque to a target torque; wherein said filtering the electric traction motor torque includes providing an initial value that is an output torque of a previous filtering process, and smoothly reducing the electric traction motor torque from the initial value to zero; wherein the controller establishes a maximum torque protection limit to limit the electric traction motor torque during the filtering; wherein the controller is further programmed to determine a quadrant the electric traction motor is operating in when the garage shift is detected; and wherein the shifter is a PRND shifter providing Park, Reverse, Neutral, and Drive operational modes for the electric vehicle.

In accordance with another example aspect of the invention, a method of method of operating a motor control system of an electric vehicle is provided. In one example implementation, the electric vehicle includes an electric traction motor to selectively provide torque to vehicle wheels, and a shifter configured to shift the electric vehicle. In one example, the method includes (i) monitoring, by a controller having one or more processors, the shifter, (ii) detecting, by the controller, a garage shift; and (iii) upon detecting the garage shift, filtering the electric traction motor torque to zero to smoothly transition the electric traction motor during the garage shift and allow the garage shift to complete before an electric motor quadrant protection is initiated.

In addition to the foregoing, the described method may include one or more of the following features: wherein the garage shift indicates a low vehicle speed shift maneuver from a first shifter position to a different second shifter position; wherein the first shifter position is Drive and the second shifter position is Reverse; wherein the first shifter position is Reverse and the second shifter position is Drive; wherein the low vehicle speed shift maneuver occurs while the electric vehicle is in motion and the electric traction motor is providing torque to the vehicle wheels; and wherein said filtering the electric traction motor torque to zero comprises smoothly reducing or increasing the motor torque to a target torque.

In addition to the foregoing, the described method may include one or more of the following features: wherein said filtering the electric traction motor torque includes providing an initial value that is an output torque of a previous filtering process, and smoothly reducing the electric traction motor torque from the initial value to zero; establishing, by the controller, a maximum torque protection limit to limit the electric traction motor torque during the filtering; determining, by the controller, a quadrant the electric traction motor is operating in when the garage shift is detected; and wherein the shifter is a PRND shifter providing Park, Reverse, Neutral, and Drive operational modes for the electric vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 2:
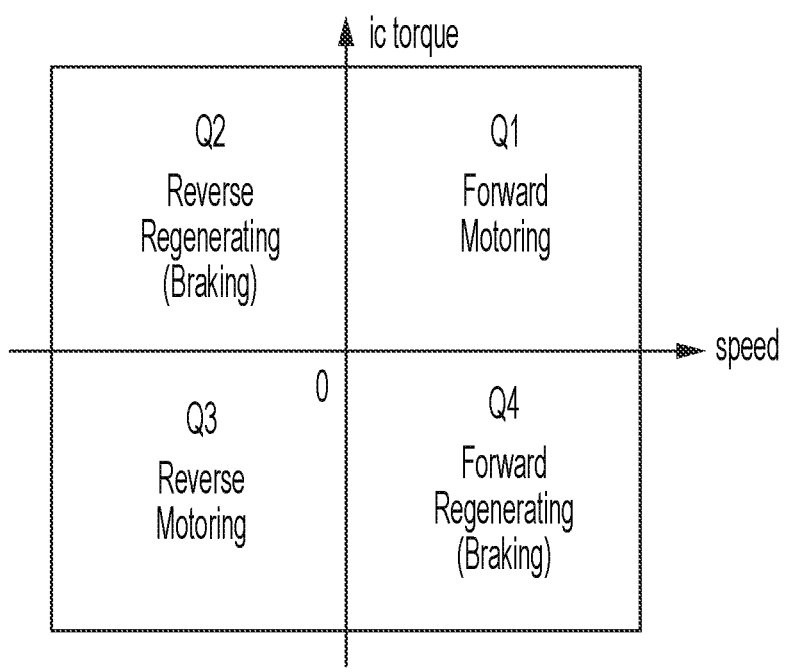
FIG. 2 is a schematic diagram of quadrants illustrating operational capabilities of an electric motor of the electric vehicle drivetrain shown in FIG. 1, in accordance with the principles of the present application.

As previously described, during a PRNLD shift at low speeds, an electric vehicle may command a motor torque to zero if the vehicle controller believes the electric motor is operating inappropriately, also known as "quadrant protection." As shown in FIG. 2, an electric motor may be operated in four quadrants, where the x-axis represents speed and the y-axis represents torque. Quadrant 'Q1' represents forward motoring with positive speed and positive torque. Quadrant 'Q2' represents negative speed (reverse) with positive torque, such as during reverse regenerative braking. Quadrant 'Q3' represents reverse motoring with negative speed and negative (reverse) torque. Quadrant 'Q4' represents positive speed with negative torque, such as during forward regenerative braking.

A goal of quadrant protection is to ensure that when the shifter position is, for example, in Drive, the controller will not command negative motor torque when traction motor speed is also positive. As such, in conventional systems, if the electric motor is identified in an incorrect quadrant, the controller will command zero motor torque immediately.

As also described, a rolling garage shift occurs where the driver shifts PRNLD positions at low vehicle speeds. For example, when shifting Reverse to Drive, the driver torque request is transitioned from a negative torque in Reverse to a positive torque in Drive. If the driver moves the shifter position from Reverse to Drive when the motor speed is negative and motor torque command is also negative, the controller may believe that the vehicle is in the wrong quadrant and subsequently steps the motor torque from a negative torque to zero. However, this is not an intended behavior during a rolling garage shift. Accordingly, described herein are systems and methods for electric motor control to provide a minimum filtered torque, filtering up the torque to zero and allowing the rolling garage shift to complete before the control intervenes to protect the vehicle against an incorrect quadrant.

In the example embodiment, because preventing incorrect quadrant torque and filtering torque to the new quadrant appears contradictory, the control system includes logic to allow for both motor protection and shift comfort. In this sway, during a garage shift, minimum and maximum torque limits are provided for motor protection while allowing for the vehicle to transition smoothly between PRNLD shifts.

Figure 1:
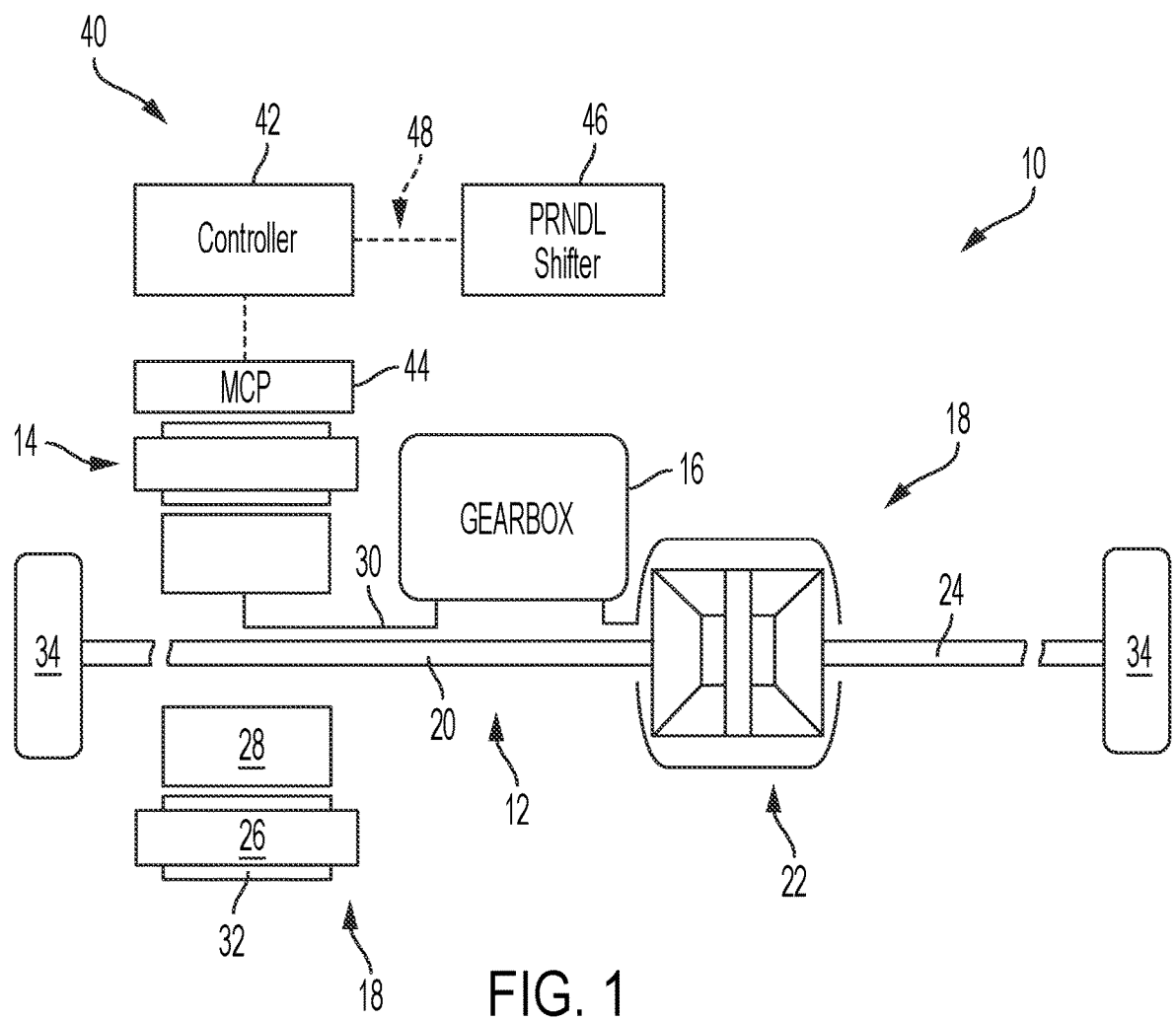
FIG. 1 is a schematic illustration of an example electric vehicle drivetrain in accordance with the principles of the present application.

With initial reference to FIG. 1, a vehicle 10 is partially shown in accordance with the principles of the present disclosure. In the example embodiment, vehicle 10 includes a propulsion system 12 that generally includes one or more drive units or motors 14 (e.g., electric traction motors) and an electric drive gearbox assembly 16. The electric motor 14 is selectively connectable via a traction inverter to a high voltage battery system (not shown) for powering the electric motor 14, and the gearbox assembly 16 is configured to transfer the generated drive torque to a driveline 18, including a first or left axle shaft 20, a differential 22, and a second or right axle shaft 24. In the example embodiment, the electric motor 14 generally includes a stator 26, a rotor 28, and a rotor output shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34.

In the example embodiment, the vehicle 10 includes a motor control system 40 having a controller 42 (e.g., engine control unit) in signal communication with the electric motor 14 via a motor controller processor (MCP) 44 and a PRNDL shifter 46. The electric motor 14 is directly controlled by the MCP 44, which is a controller configured for bi-directional communication with the controller 42 via a CAN bus 48. The controller 42 is configured to control the electric motor 14 by forwarding signals, such as operation state, torque command, and voltage setpoints to the MCP 44, and the MCP 44 provides feedback signals to the controller 42 related to the electric motor 14 such as operation status, output current, and voltage.

The controller 42 is configured to receive one or more signals from the shifter 46 indicating a desired gear, such as Park, Reverse, Neutral, Drive, or Low. Based on the one or more signals, the controller 42 is configured to provide torque commands to the MCP 44 to thereby operate the electric motor 14 to selectively rotate shaft 30 in a first (forward) direction or an opposite second (reverse) direction.

Figure 3:
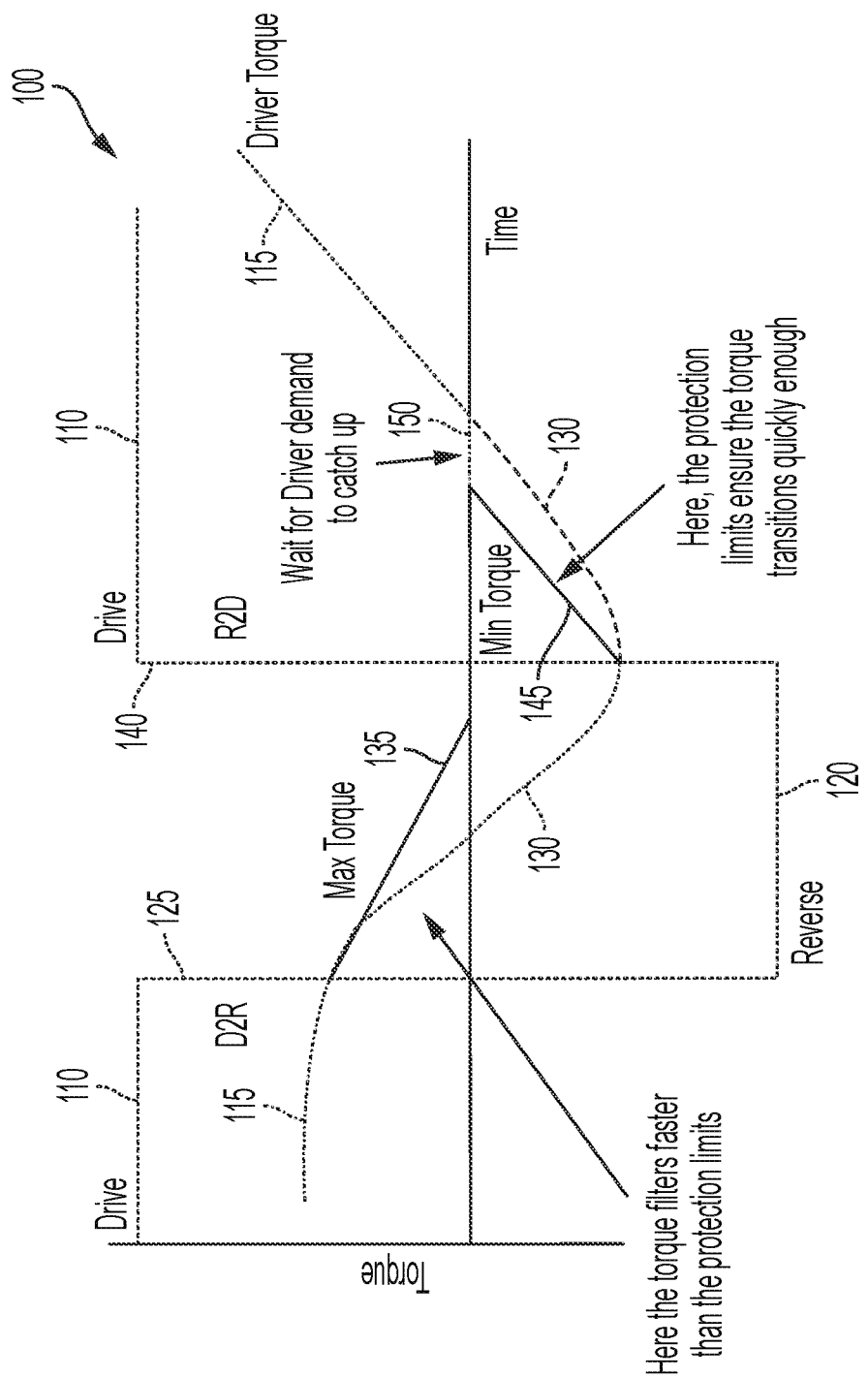
FIG. 3 is a graph illustrating an example garage shift and filtering process, in accordance with the principles of the present application.
Figure 4A:
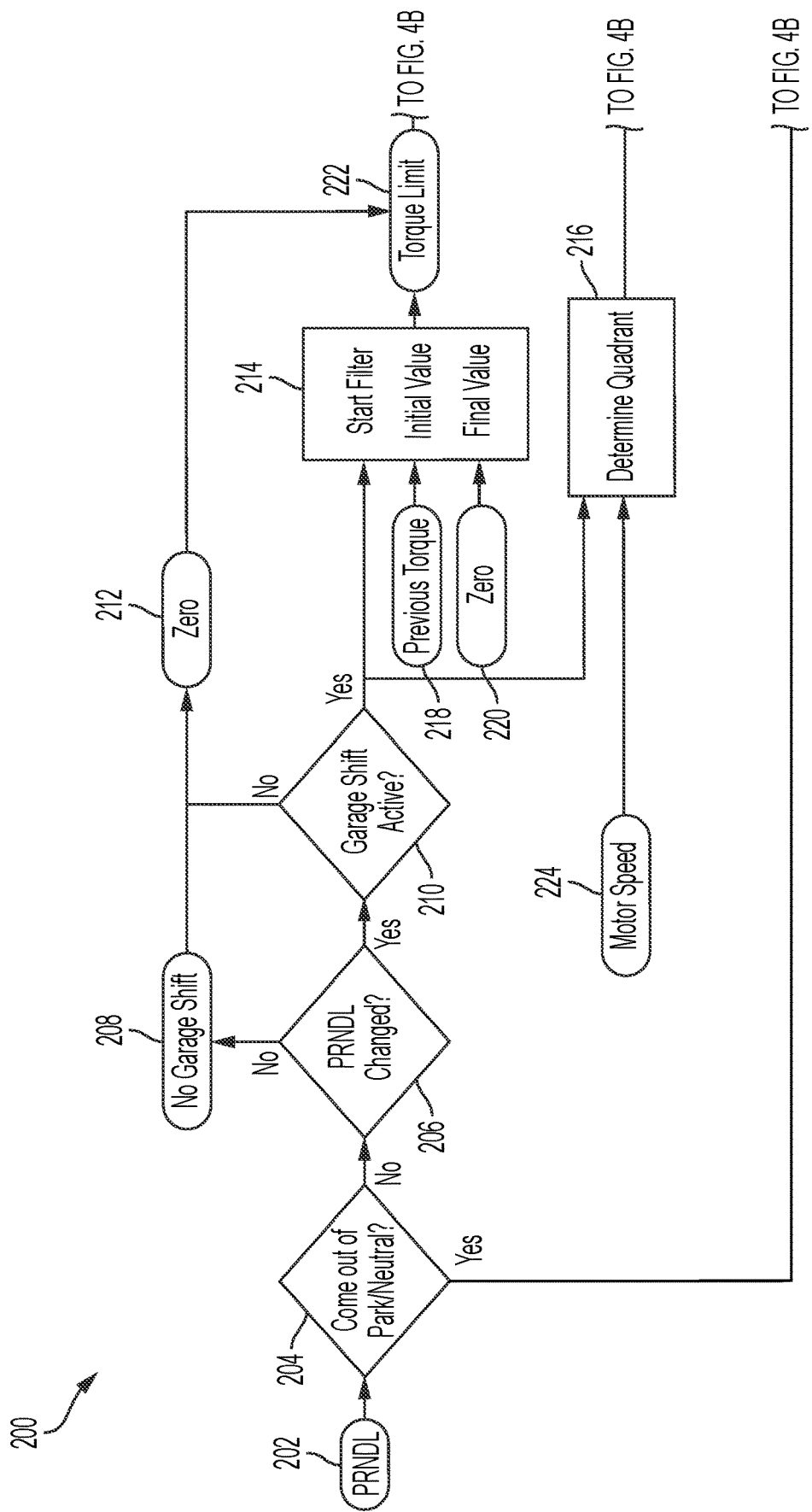
FIGS. 4A-4B illustrate an example control logic flow for operating a motor control system of the electric vehicle shown in FIG. 1, in accordance with the principles of the present application.
Figure 4B:
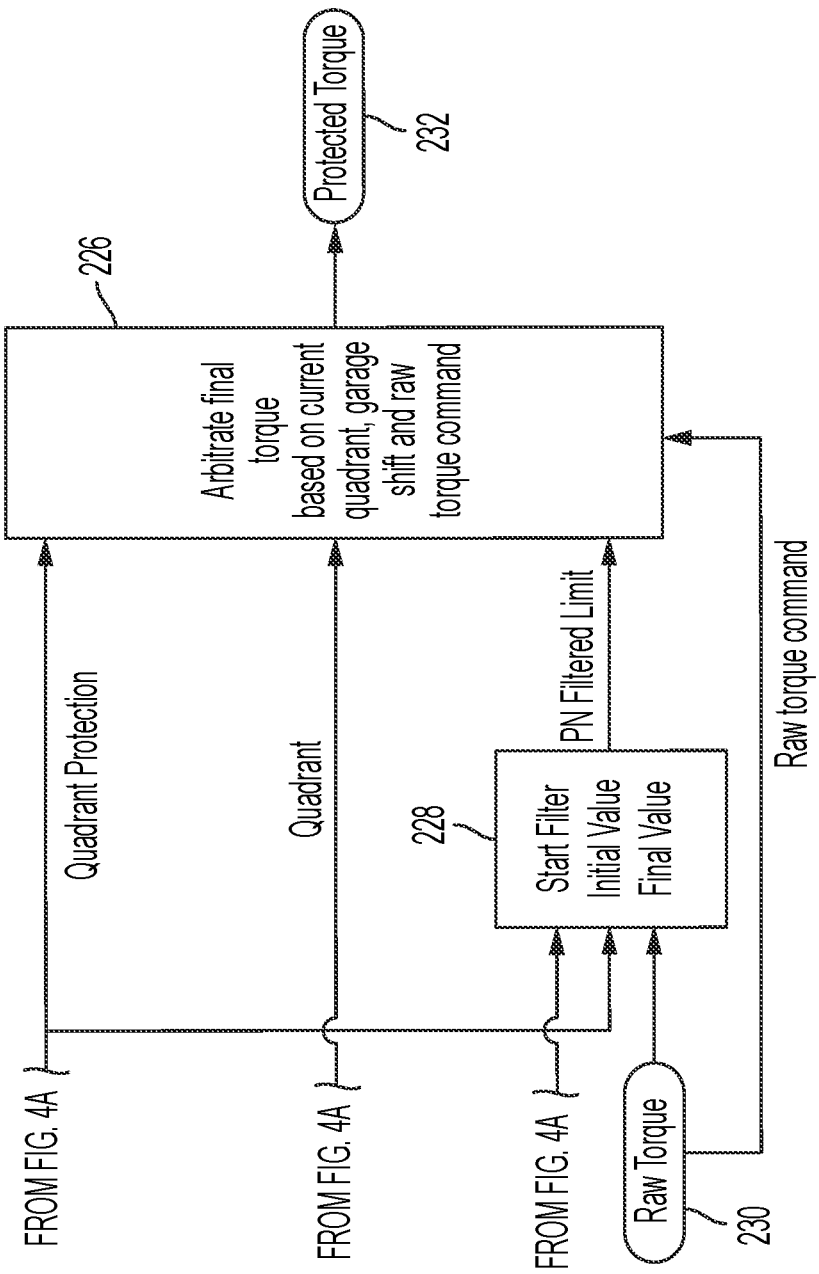

With reference now to FIGS. 3 and 4, example operations of the control system 40 for quadrant protection in steady and transient shifter positions for torque security is illustrated. In general, the control operation identifies a garage shift, filters the garage shift, finalizes the quadrant protection, and performs final checks on the operation. FIG. 3 is a graph 100 illustrating an example garage shift with the filtering process imposed. FIG. 4 illustrates a flow diagram of an example method 200 of operating the control system 40 for quadrant protection in steady and transient shifter positions for torque security.

In the example embodiment, filtering is the process of comprises smoothly reducing or increasing torque to a target torque (e.g., zero). This filtering process occurs over a calibratable time that provides small steps to reach the target torque rather than a large jump to the target, which could cause observable jerking and affect perceived driver comfort.

For example, as shown in FIG. 3, if the electric motor 14 is operating in Drive 110 and producing a positive torque 115, and the vehicle is suddenly shifted to Reverse 120 at point 125, quadrant protection is activated and wants to reduce the torque to negative torque. However, rather than simply dropping the positive torque to zero (which can cause noticeable jerking), the positive torque line 115 is filtered and smoothly reduced to zero to subsequently provide negative torque 130 commanded by the shift to Reverse 120. Additionally, the control imposes a maximum torque boundary 135 to prevent unwanted torque and ensure the vehicle achieves the driver intended direction within a calibratable time.

Similarly, when the electric motor 14 is operating in Reverse 120 and producing negative torque 130, and the vehicle is shifted to Drive 110 at point 140, quadrant protection is activated and wants to increase the torque to positive torque. However, rather than simply dropping the negative torque to zero, the negative torque line 130 is filtered and smoothly increased to zero to subsequently provide positive torque 115 commanded by the shift to Drive 110. In this scenario, control also imposes a minimum torque boundary 145. Thus, in the example, because the negative torque line 130 is outside the minimum torque boundary 145, control instead filters and increases the torque to zero along the minimum torque boundary 145. Once at zero torque, control waits for driver demand to catch up at point 150, before subsequently providing the positive torque 115 commanded by the shift to Drive 110.

With reference now to FIG. 3, method 200 of operating the control system 40 for quadrant protection in steady and transient shifter positions for torque security will be described in more detail. In one example, the control system 40 includes logic to identify a Garage Shift by looking for a change in the PRNDL position. Any PRNDL transition performed while moving could require a gentle filter to zero torque, so all PRNDL changes are considered.

The Garage Shift filtering is triggered by the PRNDL shift. The initial value of the filter is the previous output of control system 40 and/or the previously commanded motor torque. The system then filters the motor torque to zero. The system ensures that torque magnitude cannot increase, which could damage the motor and contradict driver demand. Additionally, starting the filter at the currently commanded torque ensures the quickest transition into the newest driver demand. When the filter reaches zero torque, the Garage Shift is complete, and the filtering process is no longer utilized. When a Garage Shift is not active, the limit is zero, which ensures that quadrant protection is always a hard limit the vehicle cannot violate. In this way, for non-garage shift events, quadrant protection ensures the motor torque does not conflict with the driver intended direction (PRNDL), and thus is set to prevent crossing zero.

To finalize the protection, control monitors the Garage Shift signal and motor speed. This combined information determines in which quadrant the motor is operating. If, for example, the PRNDL state went from Drive to Reverse, and there is a positive motor speed, torque needs to be filtered to zero. Otherwise, no garage shift filtering is required, and quadrant protection becomes active immediately.

As such, the control system 40 determines if the Garage Shift is TRUE, what quadrant the vehicle is operating in, and therefore what torque to filter towards. The control logic ensures that if a garage shift is FALSE, torque does not cross zero, and if TRUE, the vehicle filters quickly to zero. Additionally, the same logic is utilized for Park/Neutral. For example, if the driver shifts to Park while moving, the torque will be filtered to zero. However, when shifting out of Park/Neutral, the control is configured to ensure that the torque filters up to the demand. As such, this covers the situation where the driver shifts in and out of Park. The raw unprotected torque may still have a command, but the vehicle transitions from the protected torque up to the commanded torque.

Finally, when leaving Park/Neutral, the control system 40 may also perform a filtering process. This ensures there is not a bump in torque for a corner case where the motor torque command was not zero. This could occur, for example, if the driver garage shifts into Park/Neutral and then shifts back to Drive/Reverse before the filtering is completed. This will then start the filtering from the previous motor torque and ramp them up to actual motor torque.

In the example embodiment, the method 200 begins at step 202 where controller 42 (e.g., "control") monitors the PRNDL shifter 46. At step 204, control determines if the PRNDL shifter 46 has shifted from Park or Neutral. If yes, control proceeds to step 228. If no, control proceeds to step 206 and determines if the position of PRNDL shifter 46 has changed. If no, control proceeds to step 208. If yes, control proceeds to step 210.

At step 208, control establishes there is not a Garage Shift and proceeds to step 212 and commands zero as the torque limit, for example, because the torque limit generally should be zero for all non-garage shift scenarios to ensure quadrant protection is not violated. In this way, control establishes the torque limit. Control then proceeds to step 222, as described herein.

At step 210, control determines if a Garage Shift is active by determining if the torque remains in the wrong quadrant. Once the torque reaches zero, the garage shift is no longer active, and the torque limit returns to zero. If no, control proceeds to step 212. If yes, control sets Garage Shift as TRUE and begins a torque filter process at step 214 and a quadrant determination at step 216.

At step 214, control begins the filtering process with an initial value 218, which is the previous torque output (e.g., current torque commanded by the motor) or the previous commanded motor torque. The process filters the initial torque value to a predetermined final torque value, in this case zero torque 220. Control then proceeds to step 222 and determines a torque limit (e.g., lines 135, 145). In one example, this torque limit is (Current Torque−Goal Torque)/calibratable time=delta torque in set time. This torque limit value is subsequently used in step 226.

At step 216, control determines which quadrant (FIG. 2) the motor is operating in based on the current PRNDL status and motor speed 224. The determined quadrant is then utilized in step 226.

Returning to step 204, if the PRNDL shifter 46 has shifted from Park or Neutral, control proceeds to step 228 and begins a second filtering process with an initial value received from torque limit output 222. The process filters the initial torque value (from step 222) (e.g., zero) to a predetermined final torque value, in this case a raw torque (e.g., the final motor torque right before this protection). The second filtering process outputs a 'Park/Neutral (PN) Filtered Limit' to step 226. The 'PN Filtered Limit' filters from zero to driver (228) or from driver to zero (214).

At step 226, control receives the torque limit output 222, the determined quadrant from step 216, the PN Filtered Limit from step 228, and the raw torque command 230. Control then arbitrates a final torque based on these inputs by taking all the final torques and all information about the PN shift/garage shift/Neither and prioritizes a final torque command that is limited by the appropriate torque (e.g., zero, lines 135, 145, step 228). Based on this process, control determines a protected torque 232, which is arbitrated by the MCP 44 and felt at the wheels 34 by the driver.

Described herein are systems and methods for quadrant protection of a vehicle electric traction motor in steady and transient shifter positions. The system identifies a Garage Shift occurrence and smoothly filters motor torque to zero rather than abruptly dropping motor torque to zero. This improves driver comfort while maintaining quadrant protection of the electric traction motor.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An electric vehicle, comprising:
   an electric traction motor configured to selectively provide torque to vehicle wheels;
   a shifter configured to shift the electric vehicle; and
   a motor control system for electric traction motor quadrant protection in steady and transient shifter positions, the motor control system in signal communication with the electric traction motor and the shifter, and including a controller having one or more processors,
   wherein the controller is programmed to:
      monitor the shifter;
      detect a garage shift; and
      upon detecting the garage shift, filter the electric traction motor torque to zero to smoothly transition the electric traction motor during the garage shift and allow the garage shift to complete before quadrant protection is initiated.

2. The electric vehicle of claim 1, wherein the garage shift indicates a low vehicle speed shift maneuver from a first shifter position to a different second shifter position.

3. The electric vehicle of claim 2, wherein the first shifter position is Drive and the second shifter position is Reverse.

4. The electric vehicle of claim 2, wherein the first shifter position is Reverse and the second shifter position is Drive.

5. The electric vehicle of claim 2, wherein the low vehicle speed shift maneuver occurs while the electric vehicle is in motion and the electric traction motor is providing torque to the vehicle wheels.

6. The electric vehicle of claim 1, wherein said filtering the electric traction motor torque to zero comprises smoothly reducing or increasing the motor torque to a target torque.

7. The electric vehicle of claim 1, wherein said filtering the electric traction motor torque comprises:
   providing an initial value that is an output torque of a previous filtering process; and
   smoothly reducing the electric traction motor torque from the initial value to zero.

8. The electric vehicle of claim 7, wherein the controller establishes a maximum torque protection limit to limit the electric traction motor torque during the filtering.

9. The electric vehicle of claim 1, wherein the controller is further programmed to determine a quadrant the electric traction motor is operating in when the garage shift is detected.

10. The electric vehicle of claim 1, wherein the shifter is a PRND shifter providing Park, Reverse, Neutral, and Drive operational modes for the electric vehicle.

11. A method of operating a motor control system of an electric vehicle having an electric traction motor to selectively provide torque to vehicle wheels, and a shifter configured to shift the electric vehicle, the method comprising:
   monitoring, by a controller having one or more processors, the shifter;
   detecting, by the controller, a garage shift; and
   upon detecting the garage shift, filtering the electric traction motor torque to zero to smoothly transition the electric traction motor during the garage shift and allow the garage shift to complete before quadrant protection is initiated.

12. The method of claim 11, wherein the garage shift indicates a low vehicle speed shift maneuver from a first shifter position to a different second shifter position.

13. The method of claim 12, wherein the first shifter position is Drive and the second shifter position is Reverse.

14. The method of claim 12, wherein the first shifter position is Reverse and the second shifter position is Drive.

15. The method of claim 12, wherein the low vehicle speed shift maneuver occurs while the electric vehicle is in motion and the electric traction motor is providing torque to the vehicle wheels.

16. The method of claim 11, wherein said filtering the electric traction motor torque to zero comprises smoothly reducing or increasing the motor torque to a target torque.

17. The method of claim 11, wherein said filtering the electric traction motor torque comprises:
   providing an initial value that is an output torque of a previous filtering process; and
   smoothly reducing the electric traction motor torque from the initial value to zero.

18. The method of claim 17, further comprising establishing, by the controller, a maximum torque protection limit to limit the electric traction motor torque during the filtering.

19. The method of claim 11, further comprising determining, by the controller, a quadrant the electric traction motor is operating in when the garage shift is detected.

20. The method of claim 11, wherein the shifter is a PRND shifter providing Park, Reverse, Neutral, and Drive operational modes for the electric vehicle.

* * * * *